United States Patent
Tode et al.

(10) Patent No.: US 10,431,827 B2
(45) Date of Patent: *Oct. 1, 2019

(54) NONAQUEOUS ELECTROLYTE SECONDARY BATTERY

(71) Applicant: SANYO Electric Co., Ltd., Daito-shi, Osaka (JP)

(72) Inventors: Shingo Tode, Hyogo (JP); Toyoki Fujihara, Hyogo (JP); Toshiyuki Nohma, Hyogo (JP)

(73) Assignee: SANYO ELECTRIC CO., LTD., Daito-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,280

(22) Filed: Aug. 14, 2018

(65) Prior Publication Data

US 2018/0358623 A1    Dec. 13, 2018

Related U.S. Application Data

(63) Continuation of application No. 14/900,525, filed as application No. PCT/JP2014/003083 on Jun. 10, 2014, now Pat. No. 10,079,386.

(30) Foreign Application Priority Data

Jul. 1, 2013  (JP) .................................. 2013-137934
Jul. 1, 2013  (JP) .................................. 2013-137935

(51) Int. Cl.
*H01M 10/05* (2010.01)
*H01M 4/62* (2006.01)
(Continued)

(52) U.S. Cl.
CPC ............. *H01M 4/62* (2013.01); *H01M 2/263* (2013.01); *H01M 2/30* (2013.01); *H01M 2/345* (2013.01);
(Continued)

(58) Field of Classification Search
None
See application file for complete search history.

(56) References Cited

U.S. PATENT DOCUMENTS 5,427,875 A    6/1995    Yamamoto et al.
7,727,674 B2   6/2010    Yanagida et al.
(Continued)

FOREIGN PATENT DOCUMENTS

JP    4-328278 A    11/1992
JP    2001-257002 A    9/2001
(Continued)

OTHER PUBLICATIONS

International Search Report dated Sep. 9, 2014, issued in counterpart Application No. PCT/JP2014/003083 (2 pages).

*Primary Examiner* — Haroon S. Sheikh

(74) *Attorney, Agent, or Firm* — Westerman, Hattori, Daniels & Adrian, LLP

(57) ABSTRACT

A non-aqueous electrolyte secondary battery includes a pressure-sensitive current shut-off mechanism, wherein a positive electrode core body exposed portion is disposed at one end portion of a flat rolled electrode assembly, a negative electrode core body exposed portion is disposed at the other end portion, lithium carbonate is contained in a positive electrode mix layer, and a protective layer is disposed along the border with the positive electrode mix layer at the position opposite to a separator on the positive electrode core body exposed portion.

18 Claims, 5 Drawing Sheets

(51) Int. Cl.
*H01M 4/13* (2010.01)
*H01M 10/0587* (2010.01)
*H01M 2/26* (2006.01)
*H01M 2/34* (2006.01)
*H01M 10/052* (2010.01)
*H01M 2/30* (2006.01)
*H01M 4/36* (2006.01)
*H01M 10/42* (2006.01)

(52) U.S. Cl.
CPC ............. *H01M 4/13* (2013.01); *H01M 4/366* (2013.01); *H01M 10/052* (2013.01); *H01M 10/0587* (2013.01); *H01M 10/4235* (2013.01); *H01M 2200/20* (2013.01); *H01M 2220/20* (2013.01); *Y02T 10/7011* (2013.01)

(56) References Cited

U.S. PATENT DOCUMENTS

| | | |
|---|---|---|
| 2004/0121239 A1 | 6/2004 | Abe et al. |
| 2007/0048613 A1 | 3/2007 | Yanagida et al. |
| 2007/0224493 A1 | 9/2007 | Higuchi et al. |
| 2008/0050658 A1 | 2/2008 | Abe et al. |
| 2008/0182175 A1 | 7/2008 | Okazaki et al. |
| 2008/0280197 A1 | 11/2008 | Machida |
| 2011/0052949 A1* | 3/2011 | Byun .................... H01M 2/043 429/61 |
| 2011/0052976 A1 | 3/2011 | Ishii et al. |
| 2011/0159344 A1 | 6/2011 | Kobayashi et al. |
| 2012/0214061 A1 | 8/2012 | Machida |
| 2013/0143089 A1 | 6/2013 | Teshima et al. |
| 2014/0030562 A1 | 1/2014 | Ishii et al. |
| 2014/0162117 A1 | 6/2014 | Matsuno et al. |
| 2014/0342205 A1 | 11/2014 | Machida |
| 2015/0214513 A1 | 7/2015 | Ishii et al. |

FOREIGN PATENT DOCUMENTS

| | | | | |
|---|---|---|---|---|
| JP | 2003-331822 A | | 11/2003 | |
| JP | 2005-209395 A | | 8/2005 | |
| JP | 2007-258050 A | | 10/2007 | |
| JP | 2008/186792 A | | 8/2008 | |
| JP | 2008-277207 A | | 11/2008 | |
| JP | 2010-171020 A | | 8/2010 | |
| JP | 2010171020 A | * | 8/2010 | .......... H01M 10/052 |
| JP | 2011-49066 A | | 3/2011 | |
| JP | 2011-138632 A | | 7/2011 | |
| JP | 2011-216403 A | | 10/2011 | |
| JP | 2013-45759 A | | 3/2013 | |
| JP | 2013-73794 A | | 4/2013 | |
| JP | 2013-118057 A | | 6/2013 | |
| JP | 5488899 B2 | | 5/2014 | |
| WO | 02/059999 A1 | | 8/2002 | |

* cited by examiner

NONAQUEOUS ELECTROLYTE SECONDARY BATTERY

CROSS-REFERENCE TO RELATED APPLICATIONS

This is a Continuation of U.S. application Ser. No. 14/900,525 filed Dec. 21, 2015, which is a 371 of PCT/JP2014/003083 filed on Jun. 10, 2014, which claims priority over Japanese Application Nos. 2013-137934 and 2013-137935 filed on Jul. 1, 2013, the entire contents of which is incorporated herein by reference.

TECHNICAL FIELD

The present invention relates to a non-aqueous electrolyte secondary battery.

BACKGROUND ART

On-vehicle non-aqueous electrolyte secondary batteries used as, for example, driving power supplies for electric vehicles (EV) and hybrid electric vehicles (HEV, PHEV) are provided with pressure detection type current shut-off mechanisms in addition to safety valves for explosion protection. The pressure detection type current shut-off mechanisms is disposed in such a way as to be actuated by a gas rapidly generated in the inside of a battery under abnormal conditions and prevent burst or ignition of the battery by shutting-off a current inflow.

As for the non-aqueous electrolyte secondary battery, an increase in charging voltage has been known as one of techniques to increase the battery capacity. Also, it is known that an overcharge inhibitor, e.g., tert-amylbenzene, biphenyl (refer to PTL 1), cycloalkylbenzene compounds, or compounds having quaternary carbon adjacent to a benzene ring (refer to PTL 2), is added to a non-aqueous electrolytic solution as a safety measure when a non-aqueous electrolyte secondary battery is brought into an overcharge state. However, if the charging voltage is increased to improve the battery capacity, the overcharge inhibitor is decomposed even at a voltage set as a usual working range depending on the type of the overcharge inhibitor, so that degradation of battery characteristics and degradation of safety after charge-discharge cycle are feared.

It is also known that in order to solve such issues, the overcharge resistance is improved by adding lithium carbonate ($Li_2CO_3$) to a positive electrode mix of the non-aqueous electrolyte secondary battery (PTL 3). In the case where lithium carbonate is added to the positive electrode mix of the non-aqueous electrolyte secondary battery, when a high voltage is applied to the battery, for example, at the time of overcharge, carbon dioxide gas is generated from a positive electrode plate and, thereby, the pressure detection type current shut-off mechanism can be actuated reliably prior to the safety valve for explosion protection.

CITATION LIST

Patent Document

PTL 1: International Publication No. 2002/059999
PTL 2: Japanese Published Unexamined Patent Application No. 2008-186792
PTL 3: Japanese Published Unexamined Patent Application No. 04-328278

SUMMARY OF INVENTION

Technical Problem

The non-aqueous electrolyte secondary battery includes a rolled electrode assembly in which a positive electrode plate and a negative electrode plate are rolled in the state of being insulated from each other by a separator. In a flat rolled electrode assembly, the border portion between a positive electrode core body and a positive electrode mix layer is covered with a separator. However, the separator is flexible and, therefore, the border portion between the positive electrode core body and the positive electrode mix layer is densely covered with the separator.

In such a situation, if an overcharge state is brought about and a gas is generated on the surface of the positive electrode plate, the resulting gas is not easily moved to the outside of the flat rolled electrode assembly through the border portion between the positive electrode core body and the positive electrode mix layer and, therefore, remains on the surface of the positive electrode plate in the flat rolled electrode assembly. A current does not pass through the place where the gas is present on the surface of the positive electrode plate, so that the overcharge state is eliminated. However, in the place where the gas is not present on the surface of the positive electrode plate, the overcharge state is further facilitated.

Solution to Problem

According to a non-aqueous electrolyte secondary battery of an aspect of the present invention,
a non-aqueous electrolyte secondary battery is provided including:
a positive electrode plate in which a positive electrode mix layer is disposed on a positive electrode core body;
a negative electrode plate in which a negative electrode mix layer is disposed on a negative electrode core body;
a positive electrode terminal electrically connected to the above-described positive electrode plate;
a negative electrode terminal electrically connected to the above-described negative electrode plate;
a flat rolled electrode assembly in which the above-described positive electrode plate and the above-described negative electrode plate in the state of being insulated from each other with a separator therebetween are rolled into a flat shape;
a non-aqueous electrolytic solution; and
an outer body,
wherein a rolled positive electrode core body exposed portion is disposed at one end portion of the above-described flat rolled electrode assembly,
a rolled negative electrode core body exposed portion is disposed at the other end portion of the above-described flat rolled electrode assembly,
the above-described rolled positive electrode core body exposed portion is bundled and connected to a positive electrode collector,
the above-described rolled negative electrode core body exposed portion is bundled and connected to a negative electrode collector,
a pressure-sensitive current shut-off mechanism is disposed in at least one of a conducting path between the above-described positive electrode plate and the above-described positive electrode terminal and a conducting path between the above-described negative electrode plate and the above-described negative electrode terminal, lithium carbonate is contained in the above-described positive electrode mix layer, and a porous protective layer is disposed along the border with the above-described positive electrode mix layer at the position opposite to the above-described separator on at least one surface of the above-described positive electrode core body exposed portion.

Advantageous Effects of Invention

In the non-aqueous electrolyte secondary battery according to an aspect of the present invention, lithium carbonate is contained in the positive electrode mix layer, and the porous protective layer is disposed along the border with the positive electrode mix layer at the position opposite to the separator on at least one surface of the positive electrode core body exposed portion. In this regard, the protective layer only needs to be disposed on at least one surface of the positive electrode core body exposed portion, although may be disposed on both surfaces. Furthermore, in the case where the positive electrode core body exposed portions are disposed on both sides in the width direction of the positive electrode, the protective layers may be disposed on the positive electrode core body exposed portions of both sides.

This protective layer forms an airway in the rolling axis direction between the protective layer and the separator on the basis of a height difference formed between the positive electrode core body exposed portion and the positive electrode mix layer and, in addition, has breathability to pass a gas. Consequently, carbon dioxide gas generated by decomposition of lithium carbonate in the positive electrode mix layer at the time of overcharge is allowed to flow to the outside of the flat rolled electrode assembly through the inside of the protective layer easily. Therefore, according to the non-aqueous electrolyte secondary battery of an aspect of the present invention, carbon dioxide gas is not retained on the surface of the positive electrode mix layer easily, so that a pressure-sensitive current shut-off mechanism is allowed to be promptly reliably actuated before the internal pressure of the battery increases to a great extent and the safety at the time of overcharge becomes very good.

In this regard, the protective layer only needs to be disposed along the extension direction of the border between the positive electrode core body exposed portion and the positive electrode mix layer on the positive electrode core body exposed portion. The protective layer may be disposed in such a way as to come into contact with the positive electrode mix layer. Alternatively, the protective layer may be disposed at a distance from the positive electrode mix layer and, therefore, at a position apart from the positive electrode mix layer.

In this regard, the porosity of the protective layer is preferably specified to be larger than the porosity of the positive electrode mix layer. Consequently, carbon dioxide gas flows to the outside of the flat rolled electrode assembly through the inside of the protective layer more easily. Also, the thickness of the protective layer is preferably specified to be less than the thickness of the positive electrode mix layer. Preferably, the protective layer contains an inorganic oxide and a binder. Preferable examples of inorganic oxides include alumina, titania, zirconia, and silica. The binder is not specifically limited, although resin binders are preferable and, particularly preferably, polyvinylidene fluoride is used. Also, the protective layer may further contain an electrically conductive material, e.g., a carbon material.

DESCRIPTION OF EMBODIMENTS

Figure 1A:
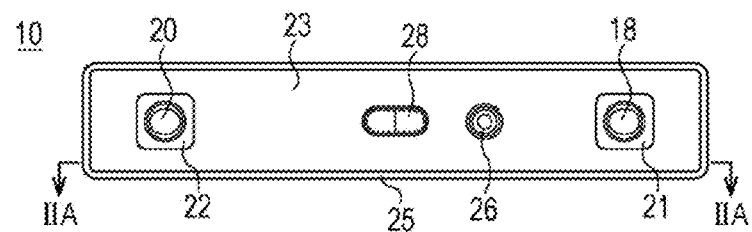
FIG. 1A is a plan view of a non-aqueous electrolyte secondary battery according to an embodiment.

The embodiments according to the present invention will be described below in detail with reference to the drawings. However, each of the embodiments described below is an exemplification for the sake of understanding the technical idea of the present invention and is not intended to specify the present invention to the embodiment. The present invention can be equally applied to various modifications without departing from the technical ideas shown in the claims.

Embodiments

To begin with, a non-aqueous electrolyte secondary battery according to an embodiment is described with reference to FIG. 1 to FIG. 4. As shown in FIG. 4, this non-aqueous electrolyte secondary battery 10 includes a flat rolled electrode assembly 14 in which a positive electrode plate 11 and a negative electrode plate 12 in the state of being insulated from each other with a separator 13 therebetween are rolled. The outermost surface side of this flat rolled electrode assembly is covered with the separator 13, and the negative electrode plate 12 is arranged on the side nearer to the outer circumference than the positive electrode plate 11 is.

Figure 3A:
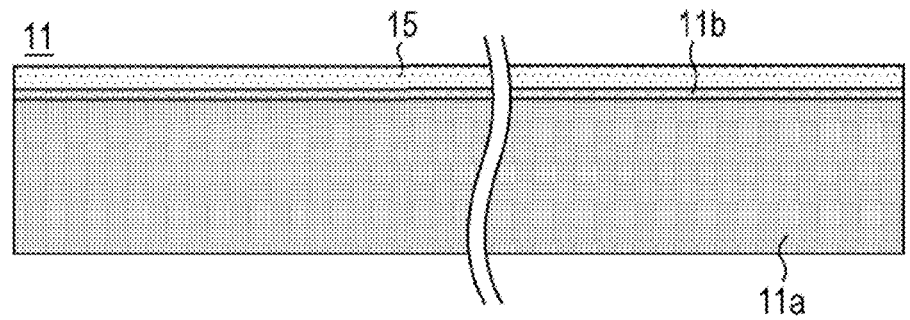
FIG. 3A is a plan view of a positive electrode plate used for a non-aqueous electrolyte secondary battery in an embodiment.

As shown in FIG. 3A, a positive electrode mix layer 11a is disposed on both surfaces of a positive electrode core body made of aluminum or aluminum alloy foil having a thickness of about 10 to 20 μm in such a way that the positive electrode core body comes into the state of being exposed in the shape of a belt along the end portion on one side in the width direction. This positive electrode core body portion exposed in the shape of a belt serves as a positive electrode core body exposed portion 15. A protective layer 11b is disposed along the length direction of the positive electrode core body exposed portion 15 on at least one surface of the positive electrode core body exposed portion 15 in such a way as to, for example, adjoin the positive electrode mix layer 11a. The specific configuration and the like of this protective layer 11b will be described later.

Figure 3B:
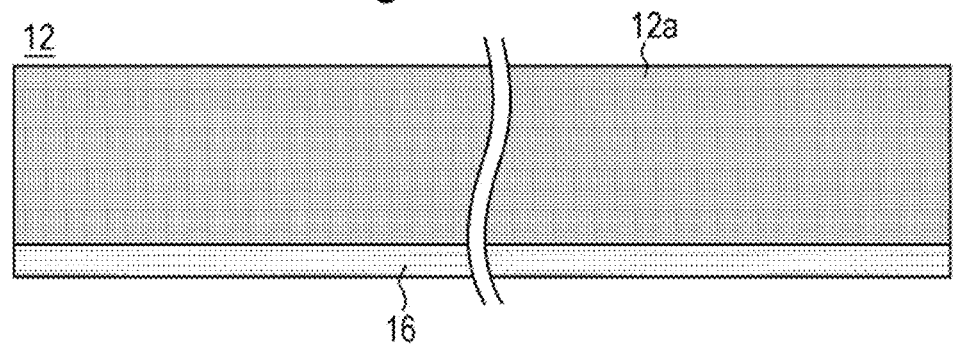
FIG. 3B is a plan view of a negative electrode plate used for the same.

In the negative electrode plate 12, as shown in FIG. 3B, a negative electrode mix layer 12a is disposed on both surfaces of a negative electrode core body made of copper or copper alloy foil having a thickness of about 5 to 15 μm in such a way that the negative electrode core body is brought into the state of being exposed in the shape of a belt along the end portion on one side in the width direction. This negative electrode core body portion exposed in the shape of a belt serves as a negative electrode core body exposed portion 16. In this regard, the positive electrode core body exposed portion 15 or the negative electrode core body exposed portion 16 may be disposed along end portions on both sides of the width direction of the positive electrode plate 11 or the negative electrode plate 12, respectively.

Figure 4A:
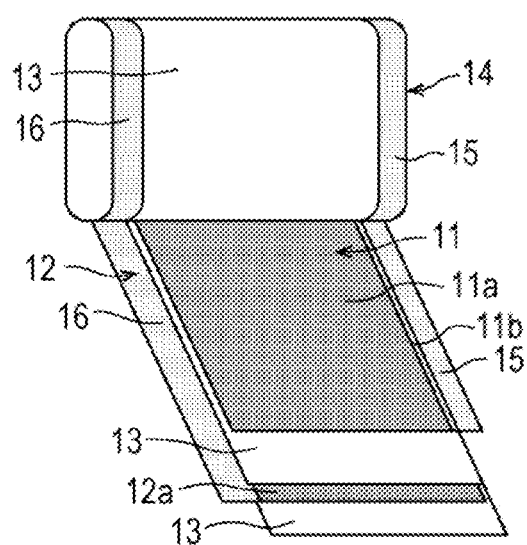
FIG. 4A is a perspective view in which a rolling end side of a flat rolled electrode assembly according to an embodiment is developed.

These positive electrode plate 11 and negative electrode plate 12 are shifted in such a way that the positive electrode core body exposed portion 15 and the negative electrode core body exposed portion 16 do not overlap the mix layers of the respective opposite electrodes and are rolled into a flat shape while being insulated from each other with the separator 13 therebetween, so that the flat rolled electrode assembly 14 is produced. As shown in FIG. 2A, FIG. 2B, and FIG. 4A, the flat rolled electrode assembly 14 is provided with a plurality of positive electrode core body exposed portions 15 stacked at one end and a plurality of negative electrode core body exposed portions 16 stacked at the other end. As for the separator 13, preferably, two sheets of polyolefin fine porous films or one folded long sheet is used. The width thereof is such an extent that the positive electrode mix layer 11a and the protective layer 11b can be covered and the width larger than the width of the negative electrode mix layer 12a is employed.

The plurality of positive electrode core body exposed portions 15 are stacked and are electrically connected to a positive electrode terminal 18 through a positive electrode collector 17. A current shut-off mechanism 27 to be actuated by a pressure of gas generated in the inside of the battery is disposed between the positive electrode collector 17 and the positive electrode terminal 18. The plurality of negative electrode core body exposed portions 16 are stacked and are electrically connected to a negative electrode terminal 20 through a negative electrode collector 19.

Figure 1B:
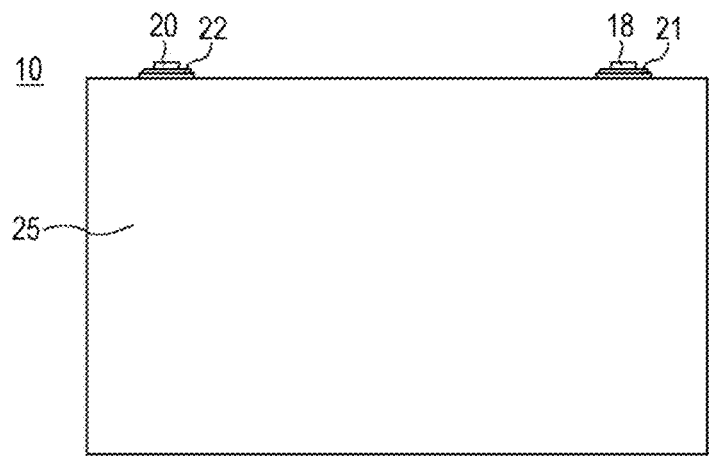
FIG. 1B is a front view of the same.

As shown in FIG. 1A, FIG. 1B, and FIG. 2A, the positive electrode terminal 18 and the negative electrode terminal 20 are fixed to a sealing body 23 through insulating members 21 and 22, respectively. The sealing body 23 is also provided with a gas discharge valve 28 to be opened when a gas pressure higher than the actuation pressure of the current shut-off mechanism 27 is applied. Each of the positive electrode collector 17, the positive electrode terminal 18, and the sealing body 23 is made of aluminum or an aluminum alloy and is used. Each of the negative electrode collector 19 and the negative electrode terminal 20 is made of copper or a copper alloy and is used.

The flat rolled electrode assembly 14 surrounded by an insulating sheet 24, which is made of a resin material, excluding the sealing body 23 side is inserted into a rectangular outer body 25, in which one face is opened. The rectangular outer body 25 is made of, for example, aluminum or an aluminum alloy and is used. The sealing body 23 is fit into an opening portion of the rectangular outer body 25, and the fitting portion of the sealing body 23 and the rectangular outer body 25 is laser welded. A non-aqueous electrolytic solution is poured into the rectangular outer body 25 from an electrolytic solution injection hole 26. This electrolytic solution injection hole 26 is hermetically sealed with, for example, a blind rivet.

The non-aqueous electrolyte secondary battery 10 is used for various uses alone or in combination, where a plurality of batteries are connected in series, in parallel, or in series and parallel. In this regard, in the case where a plurality of non-aqueous electrolyte secondary batteries 10 are connected in series or in parallel for on-vehicle uses and the like, it is favorable that a positive electrode external terminal and a negative electrode external terminal are disposed separately and individual batteries are connected with a bus bar.

The flat rolled electrode assembly 14 used in the non-aqueous electrolyte secondary battery 10 according to the embodiment is used for applications where a high battery capacity of 20 Ah or more and high output characteristics are required and, for example, the number of rolling of the positive electrode plate 11 is 43, that is, the total number of stacked sheets of the positive electrode plate 11 is a large 86. In this regard, in the case where the number of rolling is 15 or more, that is, the total number of stacked sheets is 30 or more, the battery capacity can be specified to be 20 Ah or more without upsizing the battery excessively.

If the total number of stacked sheets of the positive electrode core body exposed portions 15 or the negative electrode core body exposed portions 16 is large, as described above, in the case where the positive electrode collector 17 is attached to the positive electrode core body exposed portions 15 or the negative electrode collector 19 is attached to the negative electrode core body exposed portions 16 by resistance welding, a large welding current is required to form a weld trace 15a or a weld trace 16a which penetrates the entire stacked portion of the plurality of positive electrode core body exposed portions 15 or negative electrode core body exposed portions 16.

Figure 2C:
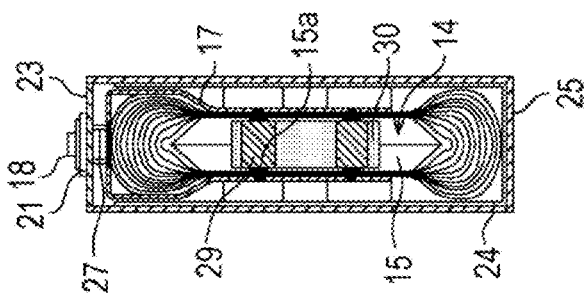
FIG. 2C is a partial sectional view along a line IIC-IIC shown in FIG. 2A.
Figure 2A:
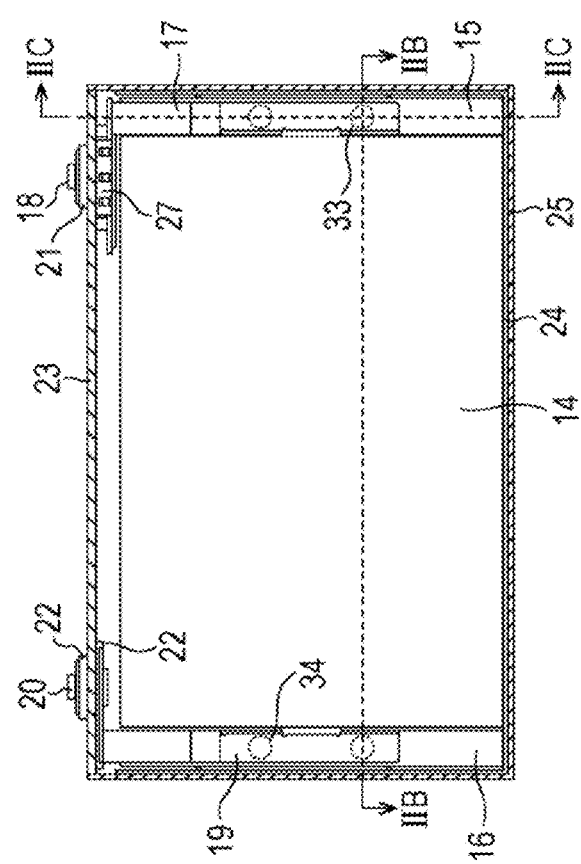
FIG. 2A is a partial sectional view along a line IIA-IIA shown in FIG. 1A.
Figure 2B:
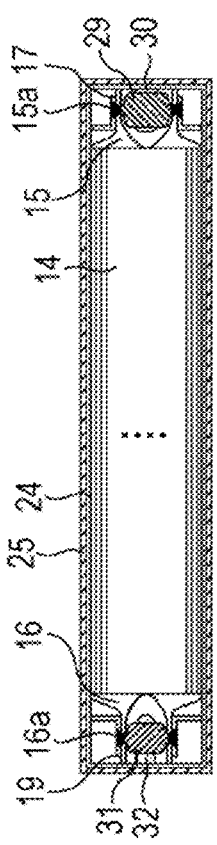
FIG. 2B is a partial sectional view along a line IIB-IIB shown in FIG. 2A.

Consequently, as shown in FIG. 2A to FIG. 2C, on the positive electrode plate 11 side, the plurality of positive electrode core body exposed portions 15 are stacked by rolling, are bundled to the central portion in the thickness direction, and are further divided into two parts. Each part is bundled centering one-quarter of the thickness of the flat rolled electrode assembly and a positive electrode intermediate member 30 is disposed between the two parts. In the positive electrode intermediate member 30, a plurality of, for example, two electrically conductive positive electrode electrically conductive members 29 are held by a base member made of a resin material. The positive electrode electrically conductive members 29 having, for example, the shape of a circular column are used, and each of them is provided with frusto-conical protrusions, which function as projection, on the side opposite to the stacked positive electrode core body exposed portions 15.

On the negative electrode plate 12 side, the plurality of negative electrode core body exposed portions 16 are stacked by rolling, are bundled to the central portion in the thickness direction, and are further divided. Each part is bundled centering one-quarter of the thickness of the flat rolled electrode assembly and a negative electrode intermediate member 32 is disposed between the parts. In the negative electrode intermediate member 32, a plurality of electrically conductive negative electrode electrically conductive members 31, here two members, are held by a base member made of a resin material. The negative electrode electrically conductive members 31 having, for example, the shape of a circular column are used, and each of them is provided with frusto-conical protrusions, which function as projection, on the side opposite to the stacked negative electrode core body exposed portions 16.

Meanwhile, the positive electrode collector 17 is disposed on each of outermost surfaces on both sides of the positive electrode core body exposed portions 15 located at both sides of the positive electrode electrically conductive member 29. The negative electrode collector 19 is disposed on each of outermost surfaces on both sides of the negative electrode core body exposed portions 16 located at both sides of the negative electrode electrically conductive member 31. In this regard, the positive electrode electrically conductive member 29 is preferably made of aluminum or aluminum alloy which is the same material as the material for the positive electrode core body. The negative electrode electrically conductive member 31 is preferably made of copper or a copper alloy which is the same material as the material for the negative electrode core body. The shapes of the positive electrode electrically conductive member 29 and the negative electrode electrically conductive member 31 may be the same or be different.

The resistance welding method by using the positive electrode core body exposed portions 15, the positive electrode collector 17, and the positive electrode intermediate member 30 having the positive electrode electrically conductive members 29 of the flat rolled electrode assembly 14 according to the embodiment and the resistance welding method by using the negative electrode core body exposed portions 16, the negative electrode collector 19, and the negative electrode intermediate member 32 having the negative electrode electrically conductive member 31 have already been known. Therefore, detailed explanations thereof will not be provided.

In the case where the positive electrode core body exposed portions 15 or the negative electrode core body exposed portions 16 is divided into two parts, as described above, the welding current required for forming a weld trace which penetrates the entire stacked portion of the plurality of positive electrode core body exposed portions 15 or negative electrode core body exposed portion 16 can be lower than that in the case where division into two parts is not performed. Consequently, generation of spatter during the resistance welding is suppressed, and occurrences of troubles, e.g., internal short-circuit of the flat rolled electrode assembly 14 resulting from spatters, are suppressed. In FIG. 2A, two weld traces 33 formed on the positive electrode collector 17 by resistance welding are shown and two weld traces 34 on the negative electrode collector 19 are shown.

Next, specific manufacturing methods or compositions of the positive electrode plate 11, the negative electrode plate 12, the protective layer 11b, the flat rolled electrode assembly 14, and the non-aqueous electrolytic solution in the non-aqueous electrolyte secondary battery 10 according to the embodiment will be described.

[Production of Positive Electrode Plate]

As for the positive electrode active material, a lithium nickel cobalt manganese complex oxide represented by $LiNi_{0.35}Co_{0.35}Mn_{0.30}O_2$ was used. This lithium nickel cobalt manganese complex oxide, a carbon powder serving as an electrically conductive agent, and polyvinylidene fluoride (PVdF) serving as a binder were weighed in such a way that the mass ratio became 88:9:3, lithium carbonate was further mixed in an amount of 1 percent by mass relative to the total amount of them, and N-methyl-2-pyrrolidone (NMP) serving as a dispersion medium was mixed, so that a positive electrode mix slurry was prepared.

The content of lithium carbonate in the positive electrode mix is preferably 0.1 to 5.0 percent by mass. If the content of lithium carbonate in the positive electrode mix is less than 0.1 percent by mass, generation of carbon dioxide gas from lithium carbonate is at a low level and the current shut-off mechanism is not easily promptly actuated. If the content of lithium carbonate in the positive electrode mix is more than 5.0 percent by mass, the proportion of lithium carbonate not involved in an electrode reaction excessively increases, so that reduction in the battery capacity is facilitated.

Subsequently, an alumina powder, graphite serving as an electrically conductive agent, polyvinylidene fluoride (PVdF) serving as a binder, and N-methylpyrrolidone (NMP) serving as a solvent were kneaded in such a way that the mass ratio of alumina powder:graphite:PVdF became 83:3:14, so that a protective layer slurry was produced.

Aluminum foil having a thickness of 15 μm was used as the positive electrode core body, and the positive electrode mix slurry and the protective layer slurry produced by the above-described method were applied to both surfaces of the positive electrode core body with a die coater. The positive electrode mix slurry and the protective layer slurry were applied to the positive electrode core body at the same time. Therefore, the positive electrode mix slurry and the protective layer slurry were joined in the vicinity of the discharge hole in the inside of the die head and are applied, so that the positive electrode mix layer 11a and the protective layer 11b (for example, width 7 mm) composed of a porous alumina layer containing graphite were formed. In this regard, one end portion in the longitudinal direction of the positive electrode core body (end portions in the same direction of both surfaces) was not coated with the slurry and the positive electrode core body was exposed, so that the positive electrode core body exposed portion 15 was formed. Then, drying was performed to remove NMP serving as the dispersion medium, compression was performed by roll press to ensure a predetermined thickness, and the resulting polar plate was cut into a predetermined dimension specified in advance.

The width of the protective layer 11b is preferably specified to be within the range in which the entire surface of the protective layer 11b is not covered with the separator 13 disposed oppositely in formation of the flat rolled electrode assembly. Also, the thickness of the protective layer 11b is preferably specified to be less than or equal to the thickness of the positive electrode mix layer 11a because if the thickness is larger than the thickness of the positive electrode mix layer 11a, reduction in the battery capacitor is caused. In this regard, the protective layer 11b is a porous layer and, therefore, is a breathable protective layer capable of passing a gas and the like smoothly. The configuration of the thus produced positive electrode plate 11 is as shown in FIG. 3A.

[Production of Negative Electrode Plate]

The negative electrode plate was produced as described below. A negative electrode mix slurry was prepared by dispersing 98 parts by mass of graphite powder, 1 part by mass of carboxymethyl cellulose (CMC), and 1 part by mass of styrene-butadiene rubber (SBR) into water. One end portion in the longitudinal direction of the die negative electrode core body of both surfaces (end portions in the same direction of both surfaces) of the negative electrode core body made of copper foil having a thickness of 10 μm was not coated with the resulting negative electrode mix slurry and the core body was exposed, so that the negative electrode core body exposed portion 16 was formed. Then, drying was performed, compression was performed by roll press to ensure a predetermined thickness, and the resulting polar plate was cut into a predetermined dimension specified in advance, so that the negative electrode plate 12 commonly used in the embodiment and a comparative example was produced. The configuration of the thus produced negative electrode plate 12 is as shown in FIG. 3B.

[Preparation of Non-Aqueous Electrolytic Solution]

In the non-aqueous electrolytic solution used, 1 mol/L of $LiPF_6$ serving as an electrolyte salt was added to a mixed solvent in which ethylene carbonate (EC) and methyl ethyl carbonate (MEC) serving as solvents were mixed at a ratio of 3:7 on a volume ratio (25° C., 1 atm) basis and 0.3 percent by mass of vinylene carbonate (VC) was added relative to the total mass of non-aqueous electrolytes.

[Production of Flat Rolled Electrode Assembly]

The negative electrode plate 12 and the positive electrode plate 11 produced as described above were rolled in such a way that the outermost surface side was the negative electrode plate 12 and the positive electrode plate 11 and the negative electrode plate 12 were insulated from each other with the separator 13 therebetween. Thereafter, forming into the flat shape was performed, so that the flat rolled electrode assembly 14 was produced.

Figure 4B:
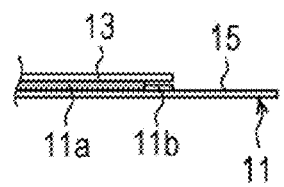
FIG. 4B is a magnified sectional view along a line IVB-IVB shown in FIG. 4A.
Figure 4C:
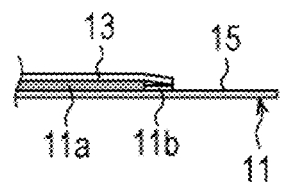
FIG. 4C is a magnified sectional view of a portion corresponding to 4B after attachment of a positive electrode collector following the rolling.

The arrangement relationship between the positive electrode core body exposed portion 15 and the separator 13 in the positive electrode plate 11 just after formation of the flat rolled electrode assembly 14 is as shown in FIG. 4B, so that a sufficient gap is formed between the positive electrode core body exposed portion 15 and the separator 13. Meanwhile, after the positive electrode collector is attached to the positive electrode core body exposed portions 15, the plurality of positive electrode core body exposed portions 15 stacked are compressed and, thereby, as shown in FIG. 4C, the gap between the positive electrode core body exposed portion 15 and the separator 13 becomes narrow. However, the breathability between the positive electrode mix layer 11a and the outside of the flat rolled electrode assembly 14 is favorably ensured because of presence of the protective layer 11b on the positive electrode core body exposed portion 15.

In particular, in the case where the width of the protective layer 11b is specified to be within the range in which the entire surface of the protective layer 11b is not covered with the separator 13 disposed oppositely, the breathability between the positive electrode mix layer 11a and the outside of the flat rolled electrode assembly 14 is always favorably ensured. Therefore, in the case where the non-aqueous electrolyte secondary battery 10 is brought into an overcharge state and carbon dioxide gas is generated by decomposition of lithium carbonate in the positive electrode mix layer 11a, the resulting carbon dioxide gas is released to the outside of the flat rolled electrode assembly 14 through the protective layer 11b easily.

Consequently, according to the non-aqueous electrolyte secondary battery 10 of the present embodiment, carbon dioxide gas is not retained on the surface of the positive electrode mix layer 11a easily, so that the pressure-sensitive current shut-off mechanism 27 (refer to FIG. 2A) is allowed to be promptly reliably actuated before the internal pressure of the battery increases to a great extent. When the pressure-sensitive current shut-off mechanism 27 is actuated, a charging current does not flow, so that generation of carbon dioxide gas thereafter is stopped. Therefore, the internal pressure of the non-aqueous electrolyte secondary battery 10 does not increase and the safety at the time of overcharge becomes very good.

COMPARATIVE EXAMPLE

The specific configuration of a non-aqueous electrolyte secondary battery according to a comparative example will be described with reference to FIG. 5 and FIG. 6. The specific configuration of the non-aqueous electrolyte secondary battery according to the comparative example is substantially the same as the configuration of the non-aqueous electrolyte secondary battery 10 according to the embodiment except the configuration of the positive electrode plate. Therefore, FIG. 1 and FIG. 2 are cited appropriately and, in addition, the same configuration portions as those in the non-aqueous electrolyte secondary battery according to the embodiment are indicated by the same reference numerals and detailed explanations thereof will not be provided.

Figure 5:
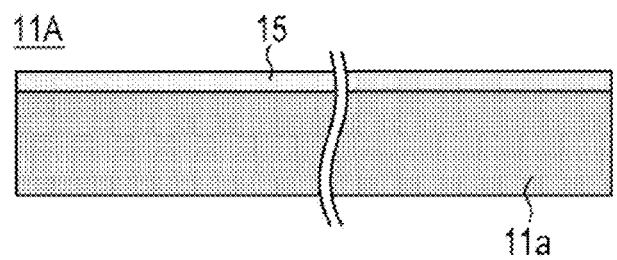
FIG. 5 is a plan view of a positive electrode plate corresponding to a comparative example.
Figure 6A:
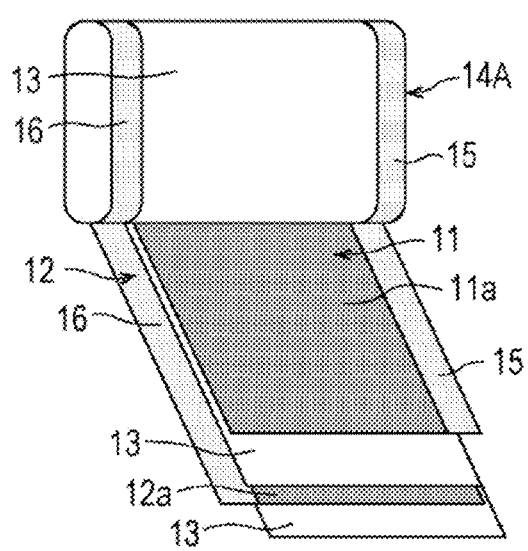
FIG. 6A is a perspective view in which a rolling end side of a flat rolled electrode assembly according to a comparative example is developed.

As shown in FIG. 5 and FIG. 6, the non-aqueous electrolyte secondary battery according to the comparative example has the same configuration as the configuration of the positive electrode plate 11 according to the embodiment except that the positive electrode plate 11A does not include the protective layer 11b in the positive electrode plate 11 according to the embodiment. The configuration of the rolling end side of a flat rolled electrode assembly 14A in the comparative example is as shown in FIG. 6A.

Figure 6B:
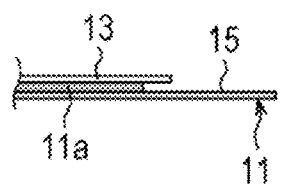
FIG. 6B is a magnified sectional view along a width direction of the positive electrode plate in FIG. 6A.
Figure 6C:
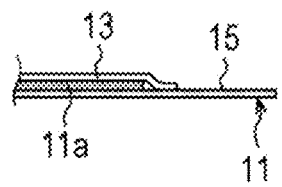
FIG. 6C is a magnified sectional view of a portion corresponding to 6B after attachment of a positive electrode collector following the rolling.

The arrangement relationship between a positive electrode core body exposed portion 15 and a separator 13 in the positive electrode plate 11A just after formation of the flat rolled electrode assembly 14A is as shown in FIG. 6B, so that a sufficient gap is formed between the positive electrode core body exposed portion 15 and the separator 13. However, after a positive electrode collector is attached to the positive electrode core body exposed portions 15, a plurality of positive electrode core body exposed portions 15 stacked are compressed and, thereby, the arrangement relationship between the positive electrode core body exposed portion 15 and the separator 13 is as shown in FIG. 6C. Consequently, the gap between the positive electrode core body exposed portion 15 and the separator 13 becomes very narrow.

Therefore, in the non-aqueous electrolyte secondary battery according to the comparative example, in the case where an overcharge state is brought about and carbon dioxide gas is generated by decomposition of lithium carbonate in a positive electrode mix layer 11a, the resulting carbon dioxide gas tends to retain on the surface side of the positive electrode mix layer 11a. In a place where carbon dioxide gas is present on the surface of the positive electrode mix layer 11a, a current does not flow and, therefore, the overcharge state is eliminated. However, in the place where carbon dioxide gas is not present on the surface of the positive electrode mix layer 11a, the current continues to flow and, therefore, the overcharge state is further facilitated. Consequently, according to the non-aqueous electrolyte secondary battery of the comparative example, the safety is insufficient as compared with the non-aqueous electrolyte secondary battery 10 according to the embodiment.

As for the non-aqueous electrolyte secondary battery 10 according to the embodiment, the example in which fine particles made of the mixture of alumina and graphite are used as the material for forming the protective layer 11b has been shown. In addition, fine particles of at least one selected from alumina, silicon dioxide, and titanium oxide or fine particles of a mixture of graphite and at least one selected from alumina, silicon dioxide, and titanium oxide can be used. In particular, in the case where alumina fine particles and graphite fine particles are used, the adhesion to the positive electrode core body or positive electrode mix layer is good. The range of particle diameter of the material for forming the positive electrode 11b has no critical limitation and can be arbitrarily selected within the range in which the thickness of the resulting protective layer 11b is smaller than the thickness of the positive electrode mix layer 11a.

As for the non-aqueous electrolyte secondary battery 10 according to the embodiment, the example in which the protective layer 11b is disposed adjoining the positive electrode mix layer 11a has been shown. However, the protective layer 11b may be disposed at the position apart from the positive electrode mix layer 11a in such a way that a gap is generated between the positive electrode mix layer 11a and the protective layer 11b. Employment of such a configuration can easily bring about a state in which the surface of the protective layer 11b is not covered with the separator 13 disposed oppositely, the movability of carbon dioxide gas becomes good and, therefore, the above-described effects are exerted particularly favorably.

As for the non-aqueous electrolyte secondary battery 10 according to the embodiment, the example in which the positive electrode core body exposed portion 15 is formed on only one end portion in the width direction of the positive electrode plate 11 and the protective layer 11b is formed at only the end portion on this side has been shown. However, the positive electrode core body exposed portions may be formed on both end portions in the width direction of the positive electrode plate 11 and a protective layer may be formed on each of the positive electrode core body exposed portions.

In the above-described embodiment, it is possible that a layer having electrical conductivity is formed, where the electrical conductivity is lower than the electrical conductivity of the positive electrode core body, as a protective layer and lithium carbonate is contained in the resulting protective layer. In this case, preferably, the protective layer contains a binder, a carbon material, and at least one selected from alumina, silica, titania, and zirconia. In this regard, in the case where each of the positive electrode mix layer and the protective layer contains lithium carbonate, the total amount of lithium carbonate is preferably 0.1 percent by mass or more and 5 percent by mass or less relative to the total mass of positive electrode active material in the positive electrode mix layer.

[Second Invention]

In the above-described embodiment, the form in which the positive electrode mix layer is allowed to contain lithium carbonate has been described. In the second embodiment, the protective layer is allowed to contain lithium carbonate instead of allowing the positive electrode mix layer to contain lithium carbonate. In this case, the protective layer is specified to have the electrical conductivity, where the electrical conductivity is lower than the electrical conductivity of the positive electrode core body.

A rectangular non-aqueous electrolyte secondary battery according to the second invention includes:

a positive electrode plate in which a positive electrode mix layer is disposed on a positive electrode core body;

a negative electrode plate in which a negative electrode mix layer is disposed on a negative electrode core body;

a positive electrode terminal electrically connected to the above-described positive electrode plate;

a negative electrode terminal electrically connected to the above-described negative electrode plate;

a flat rolled electrode assembly in which the above-described positive electrode plate and the above-described negative electrode plate in the state of being insulated from each other with a separator therebetween are rolled into a flat shape;

a non-aqueous electrolytic solution; and an outer body, wherein a rolled positive electrode core body exposed portion is disposed at one end portion of the above-described flat rolled electrode assembly, a rolled negative electrode core body exposed portion is disposed at the other end portion of the above-described flat rolled electrode assembly, the above-described rolled positive electrode core body exposed portion is bundled and connected to a positive electrode collector, the above-described rolled negative electrode core body exposed portion is bundled and connected to a negative electrode collector, a pressure-sensitive current shut-off mechanism is disposed in at least one of a conducting path between the above-described positive electrode plate and the above-described positive electrode terminal and a conducting path between the above-described negative electrode plate and the above-described negative electrode terminal, and a semiconducting protective layer containing lithium carbonate is disposed along the border with the above-described positive electrode mix layer at the position opposite to the above-described separator on at least one surface of the above-described positive electrode core body exposed portion.

In this non-aqueous electrolyte secondary battery, lithium carbonate is contained in the semiconducting protective layer, and the semiconducting protective layer is disposed along the border with the positive electrode mix layer at the position opposite to the separator on at least one surface of the positive electrode core body exposed portion. In this regard, the term "semiconducting" is used in the sense of having such a level of electrical conductivity that can maintain lithium carbonate contained in the semiconducting protective layer at a positive electrode potential and there is no need to have such a level of electrical conductivity that a metal has. This semiconducting protective layer may be disposed on at least one surface of the positive electrode core body exposed portion, although may be formed on both surfaces. Furthermore, in the case where the positive electrode core body exposed portions are disposed on both sides in the width direction of the positive electrode, the semiconducting protective layers may be disposed on the positive electrode core body exposed portions on both sides. It is preferable that the semiconducting protective layer be disposed along the extension direction of the border between the positive electrode core body exposed portion and the positive electrode mix layer on the positive electrode core body exposed portion in such a way as to come into contact with the positive electrode mix layer.

The semiconducting protective layer is maintained at the same potential as the potential of the positive electrode core body exposed portion. Therefore, when the positive electrode potential increases at the time of overcharge and the like, lithium carbonate contained in the semiconducting protective layer is decomposed and carbon dioxide gas is generated. In such a form, carbon dioxide gas does not retain in the flat rolled electrode assembly easily and flows to the outside of the flat rolled electrode assembly easily as compared with the form in which lithium carbonate contained in the positive electrode mix layer is decomposed and carbon dioxide gas is generated. Therefore, nonuniformity in the reaction due to retention of the gas between the positive electrode and the negative electrode can be suppressed and the pressure-sensitive current shut-off mechanism can be actuated more safely, so that the safety at the time of overcharge is very good.

Preferably, the semiconducting protective layer is porous in such a way that the gas can be passed. Also, the porosity of the semiconducting protective layer is preferably larger than the porosity of the positive electrode mix layer. Consequently, carbon dioxide gas generated by decomposition of lithium carbonate in the semiconducting protective layer at the time of overcharge flows to the outside of the flat rolled electrode assembly easily.

In this regard, the thickness of the semiconducting protective layer is specified to be preferably less than or equal to the thickness of the positive electrode mix layer, and more preferably less than the thickness of the positive electrode mix layer. The semiconducting protective layer may be disposed adjoining the positive electrode mix layer. Alternatively, the semiconducting protective layer may be disposed at the position apart from the positive electrode mix layer. In the case where the semiconducting protective layer is disposed at the position apart from the positive electrode mix layer, a state in which the surface of the semiconducting protective layer is not covered with the separator disposed oppositely can be brought about easily, the movability of carbon dioxide gas becomes good and, therefore, the above-described effects are exerted particularly favorably.

Preferably, the semiconducting protective layer contains fine particles of a mixture of graphite and at least one selected from alumina, silicon dioxide, and titanium oxide. Preferably, the semiconducting protective layer is disposed in such a way that a region not covered with the separator disposed oppositely is generated. In the case where the width of the semiconducting protective layer is specified to be within the range in which the entire surface of the semiconducting protective layer is not covered with the separator disposed oppositely, the breathability between the positive electrode mix layer and the outside of the flat rolled electrode assembly is always favorably ensured. Therefore, in the case where the non-aqueous electrolyte secondary battery is brought into an overcharge state and carbon dioxide gas is generated by decomposition of lithium carbonate in the semiconducting protective layer, the resulting carbon dioxide gas is released to the outside of the flat rolled electrode assembly through the semiconducting protective layer easily. The amount of lithium carbonate in the semiconducting protective layer is preferably 0.1 percent by mass or more and 5 percent by mass or less relative to the total mass of the positive electrode active material in the positive electrode mix layer.

The non-aqueous electrolyte secondary battery according to the second invention can be substantially the same as the non-aqueous electrolyte secondary battery 10 according to the above-described embodiment except that the configurations of the positive electrode mix slurry and the semiconducting protective layer slurry used in production of the positive electrode plate are different. Methods for manufacturing the positive electrode mix slurry and the semiconducting protective layer slurry will be described below.

[Positive Electrode Mix Slurry]

The positive electrode mix slurry is produced by the same method as the method of the above-described embodiment except that lithium carbonate is not added.

[Semiconducting Protective Layer Slurry]

An alumina powder, graphite serving as an electrically conductive agent, polyvinylidene fluoride (PVdF) serving as a binder, lithium carbonate, and N-methylpyrrolidone (NMP) serving as a solvent are kneaded in such a way that the mass ratio of alumina powder:graphite:lithium carbonate:PVdF becomes 82:3:1:14, so that a semiconducting protective layer slurry is produced.

In the above-described method for manufacturing the semiconducting protective layer slurry, the example in which fine particles made of the mixture of alumina and graphite are used as the material for forming the semiconducting protective layer has been shown. However, fine particles of a mixture of graphite and at least one selected from alumina, silicon dioxide, and titanium oxide can also be used. In particular, in the case where alumina fine particles and graphite fine particles are used, the adhesion to the positive electrode core body or positive electrode mix layer is good. The range of particle diameter of the material for forming the semiconducting protective layer has no critical limitation and can be arbitrarily selected within the range in which the thickness of the resulting protective layer is smaller than the thickness of the positive electrode mix layer. The positive electrode core body exposed portion may be formed on only one end portion in the width direction of the positive electrode plate and the semiconducting protective layer may be formed at only the end portion on this side. Alternatively, the positive electrode core body exposed portions may be formed on both sides in the width direction of the positive electrode plate and a semiconducting protective layer may be formed on each of the positive electrode core body exposed portions.

Preferably, the semiconducting protective layer is specified to be a layer having electrical conductivity, where the electrical conductivity is lower than the electrical conductivity of the positive electrode core body. Preferably, the semiconducting protective layer contains a binder, a carbon material, and at least one selected from alumina, silica, titania, and zirconia.

In this regard, as for the positive electrode active material usable for the non-aqueous electrolyte secondary battery according to the invention described in the present specification, compounds capable of reversively occluding and releasing lithium ions can be appropriately selected and used. As for such positive electrode active materials, lithium transition metal complex oxides, which can reversively occlude and release lithium ions and which are represented by $LiMO_2$ (where M is at least one of Co, Ni, and Mn), that is, $LiCoO_2$, $LiNiO_2$, $LiNi_yCo_{1-y}O_2$ (y=0.01 to 0.99), $LiMnO_2$, and $LiCo_xMn_yNi_zO_2$ (x−y+z=1), $LiMn_2O_4$, $LiFePO_4$, can be used as the positive electrode active material singularly or in a mixed state of two or more among them. In addition, a material obtained by adding a hetero metal element, e.g., zirconium, magnesium or aluminum, to a lithium cobalt compound oxide is also usable.

The solvent of the non-aqueous electrolyte is not specifically limited and solvents previously employed for the non-aqueous electrolyte secondary battery can be used. For example, cyclic carbonates, e.g., ethylene carbonate (EC), propylene carbonate (PC), butylene carbonate, and vinylene carbonate (VC); chain carbonates, e.g., dimethyl carbonate (DMC), methylethyl carbonate (MEC), and diethyl carbonate (DEC); ester-containing compounds, e.g., methyl acetate, ethyl acetate, propyl acetate, methyl propionate, ethyl propionate, and γ-butyrolactone; sultone-containing compounds, e.g., propane sultone; ether-containing compounds, e.g., 1,2-dimethoxyethane, 1,2-diethoxyethane, tetrahydrofuran, 1,2-dioxane, 1,4-dioxane, and 2-methyl tetrahydrofuran; nitrile-containing compounds, e.g., butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and amide-containing compounds, e.g., dimethylformamide, can be used. In particular, solvents in which part of H in these solvents has been substituted with F are used preferably. Also, these solvents can be used alone or in combinations of a plurality of types. In particular, solvents on the basis of combinations of cyclic carbonate and chain carbonate and solvents on the basis of combinations of a compound containing a small amount of nitrile or an ether-containing compound with them are preferable.

Also, an ionic liquid can be used as the non-aqueous solvent of the non-aqueous electrolyte. In this case, cation species and anion species are not specifically limited. However, from the viewpoint of low viscosity, electrochemical stability, and hydrophobicity, a combination by using a pyridinium cation, an imidazolium cation, or a quaternary ammonium cation as the cation and a fluorine-containing imide anion as the anion is particularly preferable.

In addition, a known lithium salt which has been previously commonly used for the non-aqueous electrolyte secondary battery can be used as a solute to be used for the non-aqueous electrolyte. Then, a lithium salt containing at least one of element of P, B, F, O, S, N, and Cl can be used as such a lithium salt. Specifically, lithium salts, e.g., $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$, and $LiPF_2O_2$, and mixtures thereof can be used. In particular, in order to enhance the high rate charge and discharge characteristics and the durability of the non-aqueous electrolyte secondary battery, it is preferable to use $LiPF_6$.

Also, a lithium salt, in which an oxalate complex serves as an anion, can be used as the solute. As for the lithium salt in which an oxalate complex serves as an anion, besides LiBOB (lithium-bisoxalate borate), a lithium salt having an anion in which $C_2O_4^{2-}$ is coordinated to the center atom, for example, a lithium salt represented by $Li[M(C_2O_4)_xR_y]$ (in the formula, M represents an element selected from transition metals and group 13, group 14, and group 15 of the periodic table, R represents a group selected from halogens, alkyl groups, and halogen-substituted alkyl groups, x represents a positive integer, and y represents 0 or a positive integer) can be used. Specific examples include $Li[B(C_2O_4)F_2]$, $Li[P(C_2O_4)F_4]$, and $Li[P(C_2O_4)_2F_2]$. However, in order to form a stable coating film on the negative electrode surface even under a high temperature environment, LiBOB is used most preferably.

In this regard, not only the above-described solutes are used alone but also at least two types may be used in combination.

Meanwhile, the concentration of the solute is not specifically limited, although 0.8 to 1.7 mol per liter of non-aqueous electrolytic solution is desirable. Furthermore, in the use where discharge at a large current is required, the concentration of the above-described solute is desirably 1.0 to 1.6 mol per liter of non-aqueous electrolytic solution.

In the non-aqueous electrolyte secondary battery according to an aspect of the invention described in the present specification, the negative electrode active material used for the negative electrode is not specifically limited insofar as the negative electrode active material can reversibly occlude and release lithium ions. For example, carbon materials, lithium metal, metal or alloy materials which are alloyed with lithium, metal oxides, and the like can be used. In this regard, it is preferable that carbon materials be used for the negative electrode active material from the viewpoint of material cost. For example, natural graphite, artificial graphite, mesophase pitch based carbon fibers (MCF), mesocarbon microbeads (MCMB), coke, and hard carbon can be used. In particular, from the viewpoint of improvement of the high rate charge and discharge characteristics, it is preferable that the carbon material in which a graphite material is covered with low crystalline carbon be used as the negative electrode active material.

A known separator which has been previously commonly used for the non-aqueous electrolyte secondary battery can be used as the separator. Specifically, not only a separator made of polyethylene but also a polyethylene having a surface provided with a polypropylene layer or a polyethylene separator having a surface coated with an aramid resin may be used.

A layer including an inorganic material filler, which has been used previously, can be disposed at the interface between the positive electrode and the separator or the interface between the negative electrode and the separator. As for the filler, oxides or phosphate compounds by using titanium, aluminum, silicon, magnesium, and the like alone or in combination, which have been used previously, and those having surfaces treated with a hydroxide or the like can be used. Meanwhile, as for formation of the filler layer, for example, a method in which formation is performed by directly applying a filler-containing slurry to the positive electrode, the negative electrode, or the separator and a method in which a sheet formed from a filler is stuck on the positive electrode, the negative electrode, or the separator can be used.

In the above-described embodiment and the second invention, the non-aqueous electrolyte secondary battery in which the pressure-sensitive current shut-off mechanism is disposed in at least one of the conducting path between the positive electrode plate and the positive electrode terminal and the conducting path between the negative electrode plate and the negative electrode terminal has been explained. It is considered that a non-aqueous electrolyte secondary battery, in which a pressure-sensitive forced short-circuit mechanism is disposed instead of disposition of the pressure-sensitive current shut-off mechanism, is produced.

Figure 7:
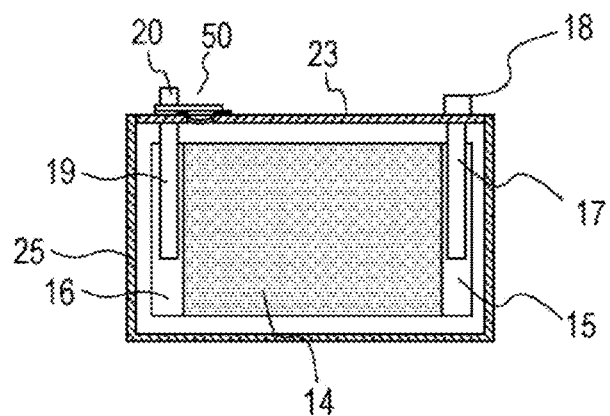
FIG. 7 is a sectional view of a non-aqueous electrolyte secondary battery provided with a forced short-circuit mechanism.
Figure 8A:
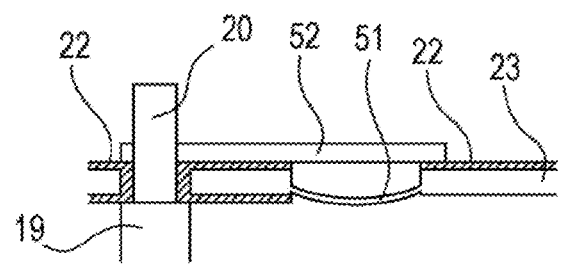
FIG. 8A is a diagram showing the state before actuation of a forced short-circuit mechanism.

It is preferable that the forced short-circuit mechanism be disposed in the vicinity of the negative electrode terminal 20 of a sealing body 23, as shown in FIG. 7. FIG. 8 is a magnified diagram of a portion in which the forced short-circuit mechanism 50 is disposed. FIG. 8A shows the state before actuation of the forced short-circuit mechanism 50, and FIG. 8B shows the state after actuation of the forced short-circuit mechanism.

As shown in FIG. 8A, the metal sealing body 23 has a valve portion 51 electrically connected to the positive electrode plate 11, and a tabular electrically conductive member 52 electrically connected to the negative electrode plate 12 is disposed outside this valve portion 51. The valve portion 51 is made of a metal and may be integrally formed with the sealing body 23. Alternatively, the valve portion 51 independent from the sealing body 23 may be connected to the sealing body 23. Here, the electrically conductive member 52 is connected to the negative electrode terminal 20 and is connected to the negative electrode plate 12 through the negative electrode collector 19. In this regard, the electrically conductive member 52, the negative electrode terminal 20, and the negative electrode collector 19 are electrically insulated from the sealing body 23 with an insulating member 22.

Figure 8B:
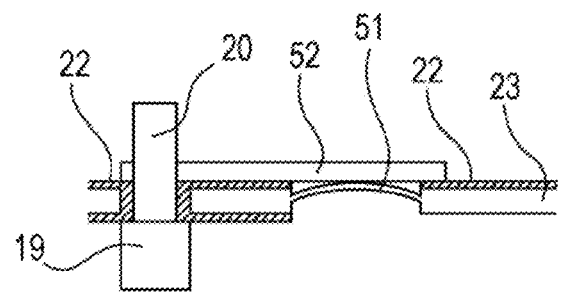
FIG. 8B is a diagram showing the state after actuation of the forced short-circuit mechanism.

In the case where the battery is brought into an overcharge state and the internal pressure of the battery has increased to a predetermined value or more, as shown in FIG. 8B, the valve portion 51 is deformed outward (upward in FIG. 8B) and comes into contact with the electrically conductive member 52. The valve portion 51 is made of a metal and is electrically connected to the positive electrode plate 11, and the electrically conductive member 52 is electrically connected to the positive electrode plate 12. Therefore, the positive electrode plate 11 and the negative electrode plate 12 are brought into a short-circuit state by contact of the valve portion 51 and the electrically conductive member 52. Consequently, flowing of a charging current into the electrode assembly can be prevented. Also, the energy in the electrode assembly can be released promptly. In this manner, in the case where the battery is brought into an overcharge state, the safety can be ensured.

REFERENCE SIGNS LIST 10 non-aqueous electrolyte secondary battery 11, 11A positive electrode plate 11a positive electrode mix layer 11b protective layer 12 negative electrode plate 12a negative electrode mix layer
13 separator 14, 14A flat rolled electrode assembly positive electrode core body exposed portion
15a weld trace 16 negative electrode core body exposed portion 17 positive electrode collector
18 positive electrode terminal 19 negative electrode collector 20 negative electrode terminal
21, 22 insulating member 23 sealing body 24 insulating sheet
25 rectangular outer body 26 electrolytic solution injection hole 27 current shut-off mechanism
28 gas discharge valve 29 positive electrode electrically conductive member 30 positive electrode intermediate member
31 negative electrode electrically conductive member negative electrode intermediate member 33, 34 weld trace
50 forced short-circuit mechanism 51 valve portion electrically conductive member

The invention claimed is:

1. A non-aqueous electrolyte secondary battery comprising:
a positive electrode plate in which a positive electrode mix layer is disposed on a positive electrode core body;
a negative electrode plate in which a negative electrode mix layer is disposed on a negative electrode core body;
a positive electrode terminal electrically connected to the positive electrode plate;
a negative electrode terminal electrically connected to the negative electrode plate;
a flat rolled electrode assembly in which the positive electrode plate and the negative electrode plate in the state of being insulated from each other with a separator therebetween are rolled into a flat shape;
a non-aqueous electrolytic solution; and
an outer body,
wherein a rolled positive electrode core body exposed portion is disposed at one end portion of the flat rolled electrode assembly,
a rolled negative electrode core body exposed portion is disposed at the other end portion of the flat rolled electrode assembly,
the rolled positive electrode core body exposed portion is bundled and connected to a positive electrode collector,
the rolled negative electrode core body exposed portion is bundled and connected to a negative electrode collector,
a pressure-sensitive forced short-circuit mechanism that short-circuits the positive electrode plate and the negative electrode plate in response to an increase in pressure inside the outer body,
lithium carbonate is contained in the positive electrode mix layer, and
a porous protective layer is disposed along the border with the positive electrode mix layer at the position opposite to the separator on at least one surface of the positive electrode core body exposed portion,
wherein the protective layer has electrical conductivity and is a protective layer having the electrical conductivity lower than that of the positive electrode core body, and
the protective layer contains lithium carbonate.

2. The non-aqueous electrolyte secondary battery according to claim 1, wherein the thickness of the protective layer is less than or equal to the thickness of the positive electrode mix layer.

3. The non-aqueous electrolyte secondary battery according to claim 1, wherein the protective layer is disposed adjoining the positive electrode mix layer.

4. The non-aqueous electrolyte secondary battery according to claim 1, wherein the protective layer is disposed at the position apart from the positive electrode mix layer.

5. The non-aqueous electrolyte secondary battery according to claim 1, wherein the protective layer contains at least one of alumina particles and graphite particles.

6. The non-aqueous electrolyte secondary battery according to claim 1, wherein the protective layer is disposed in such a way that a region not covered with the separator disposed oppositely is generated.

7. The non-aqueous electrolyte secondary battery according to claim 1, wherein the lithium carbonate concentration in the positive electrode mix layer is 0.1 percent by mass or more and 5 percent by mass or less relative to the mass of the positive electrode mix.

8. The non-aqueous electrolyte secondary battery according to claim 1, wherein the outer body is rectangular.

9. The non-aqueous electrolyte secondary battery according to claim 1, wherein the protective layer contains a binder, a carbon material, and at least one selected from alumina, silica, and zirconia.

10. The non-aqueous electrolyte secondary battery according to claim 1, wherein the porosity of the protective layer is larger than the porosity of the positive electrode mix layer.

11. A non-aqueous electrolyte secondary battery comprising:
a positive electrode plate in which a positive electrode mix layer is disposed on a positive electrode core body;
a negative electrode plate in which a negative electrode mix layer is disposed on a negative electrode core body;
a positive electrode terminal electrically connected to the positive electrode plate;
a negative electrode terminal electrically connected to the negative electrode plate;

a flat rolled electrode assembly in which the positive electrode plate and the negative electrode plate in the state of being insulated from each other with a separator therebetween are rolled into a flat shape;
a non-aqueous electrolytic solution; and
an outer body,
wherein a rolled positive electrode core body exposed portion is disposed at one end portion of the flat rolled electrode assembly,
a rolled negative electrode core body exposed portion is disposed at the other end portion of the flat rolled electrode assembly,
the rolled positive electrode core body exposed portion is bundled and connected to a positive electrode collector,
the rolled negative electrode core body exposed portion is bundled and connected to a negative electrode collector,
a pressure-sensitive forced short-circuit mechanism that short-circuits the positive electrode plate and the negative electrode plate in response to an increase in pressure inside the outer body,
lithium carbonate is contained in the positive electrode mix layer, and
a porous protective layer is disposed along the border with the positive electrode mix layer at the position opposite to the separator on at least one surface of the positive electrode core body exposed portion,
wherein the porosity of the protective layer is larger than the porosity of the positive electrode mix layer.

12. The non-aqueous electrolyte secondary battery according to claim 11, wherein the thickness of the protective layer is less than or equal to the thickness of the positive electrode mix layer.

13. The non-aqueous electrolyte secondary battery according to claim 11, wherein the protective layer contains at least one of alumina particles and graphite particles.

14. A non-aqueous electrolyte secondary battery comprising:
a positive electrode plate in which a positive electrode mix layer is disposed on a positive electrode core body;
a negative electrode plate in which a negative electrode mix layer is disposed on a negative electrode core body;
a positive electrode terminal electrically connected to the positive electrode plate;
a negative electrode terminal electrically connected to the negative electrode plate;
a flat rolled electrode assembly in which the positive electrode plate and the negative electrode plate in the state of being insulated from each other with a separator therebetween are rolled into a flat shape;
a non-aqueous electrolytic solution; and
an outer body,
wherein a rolled positive electrode core body exposed portion is disposed at one end portion of the flat rolled electrode assembly,
a rolled negative electrode core body exposed portion is disposed at the other end portion of the flat rolled electrode assembly,
the rolled positive electrode core body exposed portion is bundled and connected to a positive electrode collector,
the rolled negative electrode core body exposed portion is bundled and connected to a negative electrode collector,
a pressure-sensitive forced short-circuit mechanism that short-circuits the positive electrode plate and the negative electrode plate in response to an increase in pressure inside the outer body,
lithium carbonate is contained in the positive electrode mix layer, and
a porous protective layer is disposed along the border with the positive electrode mix layer at the position opposite to the separator on at least one surface of the positive electrode core body exposed portion,
wherein the protective layer is disposed in such a way that a region not covered with the separator disposed oppositely is generated.

15. The non-aqueous electrolyte secondary battery according to claim 14, wherein the thickness of the protective layer is less than or equal to the thickness of the positive electrode mix layer.

16. The non-aqueous electrolyte secondary battery according to claim 14, wherein the protective layer contains at least one of alumina particles and graphite particles.

17. The non-aqueous electrolyte secondary battery according to claim 14, wherein the outer body is sealed.

18. The non-aqueous electrolyte secondary battery according to claim 14, wherein a width (W1) of the protective layer in a direction along a rolling axis of the flat rolled electrode assembly is greater than a distance (W2) from an end of the positive electrode mix layer to an end of the separator in a vicinity of a distal end of the positive electrode core body exposed portion.

* * * * *